United States Patent [19]
Tann et al.

[11] 3,855,708
[45] Dec. 24, 1974

[54] SELF-ACTUATED DIGITAL LOCATION SENSOR

[75] Inventors: Lewis H. Tann, Troy; Robert J. Carroll, Warren, both of Mich.; Donald L. Lipke, Richardson, Tex.

[73] Assignee: Candid Logic Inc., Hazel Park, Mich.

[22] Filed: Oct. 16, 1972

[21] Appl. No.: 298,176

[52] U.S. Cl............ 33/169 R, 33/174 L, 200/16 B, 200/16 D
[51] Int. Cl. ........................................... G01b 7/00
[58] Field of Search .......... 33/169 R, 172 R, 172 E, 33/174 L, 143 L, 147 N, 148 H, 149 J, DIG. 15, 1 L; 340/188 R; 200/16 B, 16 C, 16 D

[56] References Cited
UNITED STATES PATENTS

| | | | |
|---|---|---|---|
| 830,497 | 9/1906 | Dahl | 200/16 B |
| 1,837,693 | 12/1931 | Tracy | 200/16 C |
| 1,906,085 | 4/1933 | Norviel | 200/16 D |
| 2,633,485 | 3/1953 | Patnode | 200/16 B |
| 3,217,307 | 11/1965 | Fogelquist | 340/188 R |
| 3,298,605 | 1/1967 | Bucke | 33/143 L |
| 3,670,421 | 6/1972 | Kiewicz | 33/174 L |
| 3,745,270 | 7/1973 | Granitz | 200/16 C |

Primary Examiner—John Petrakes
Attorney, Agent, or Firm—Fisher, Krass, Young & Gerhardt

[57] ABSTRACT

A probe used to measure the distance of a test point from a reference point employs an elongated housing fixed with respect to the reference location and a probe rod having one end slidably supported within the housing and the other end projecting out of the housing for motion toward and away from the test point. A piston slidable within the housing is fixed to the rod and pressurized air is admitted into the housing to move the piston and the rod in an extending direction against a biasing spring until the far end of the rod contacts the test surface. Brushes carried by the rod move along a multi-segment commutator during motion of the rod, making contact with different elements of the commutator. The brushes may make contact with a plurality of commutator elements at the same time. Contacts between the brushes and the commutator segments energize one of a plurality of lights to indicate the position of the rod relative to the housing. Electronic logic circuitry conditions the signals to insure a single unique output indication independent of the direction of motion of the brushes relative to the commutator.

6 Claims, 5 Drawing Figures

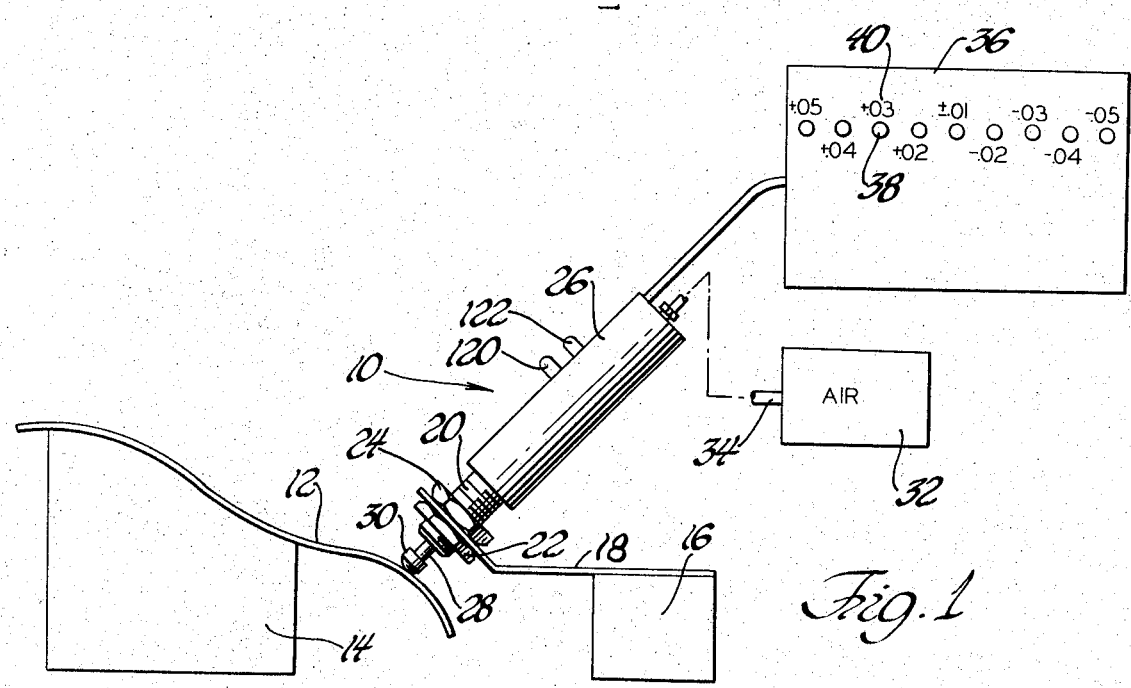
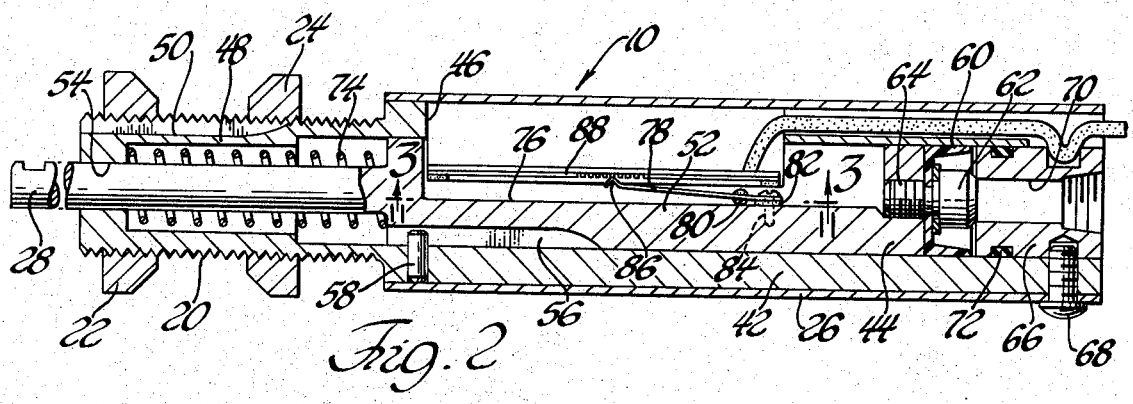
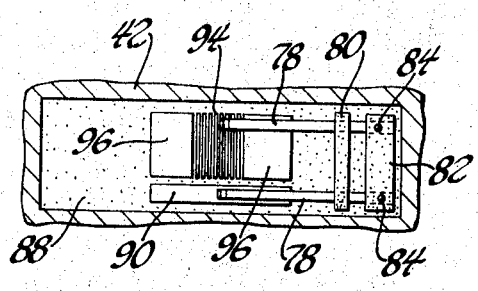
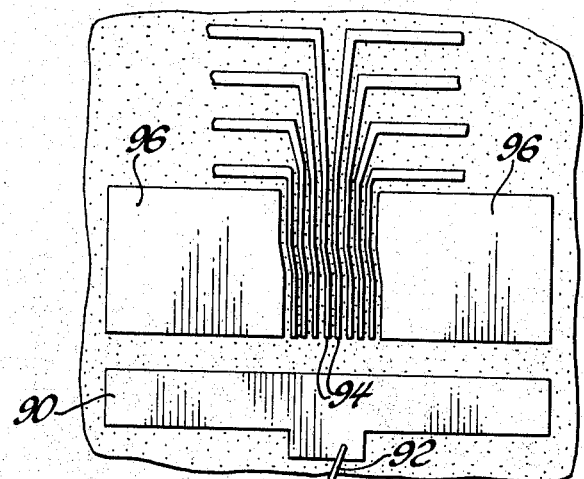

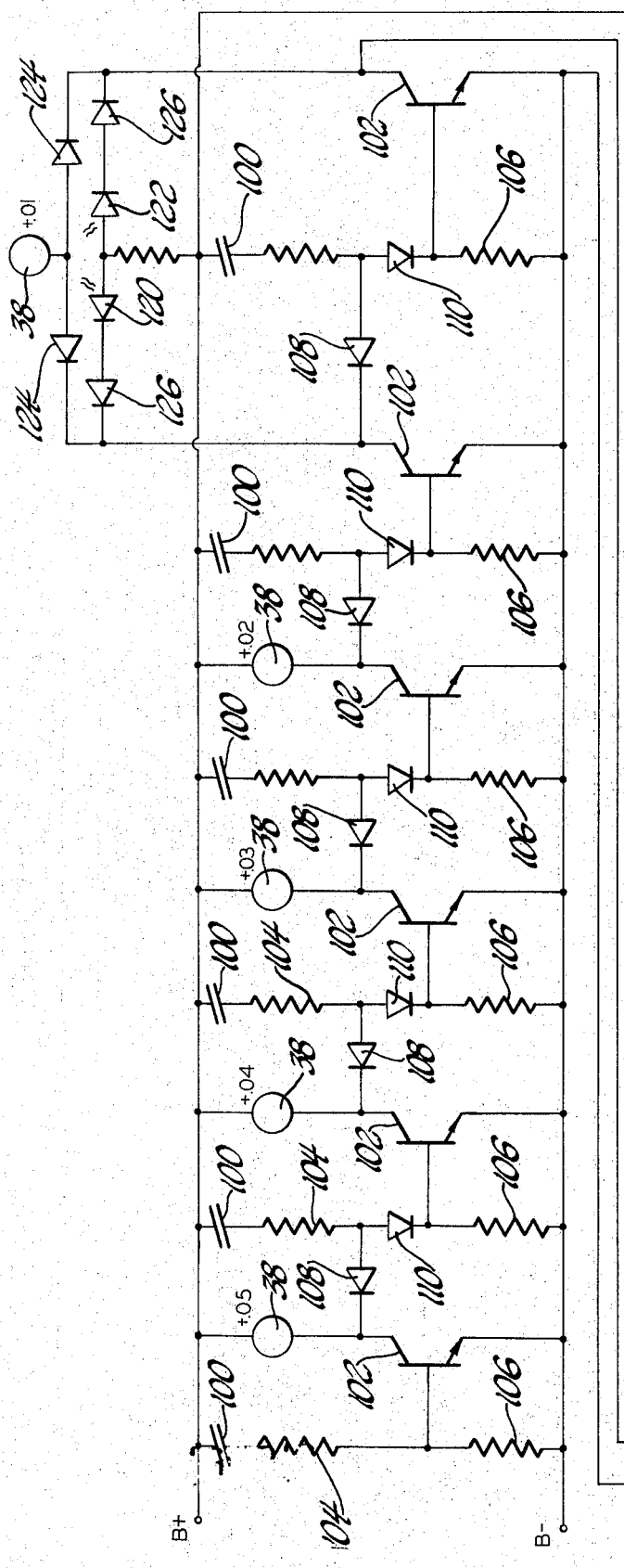
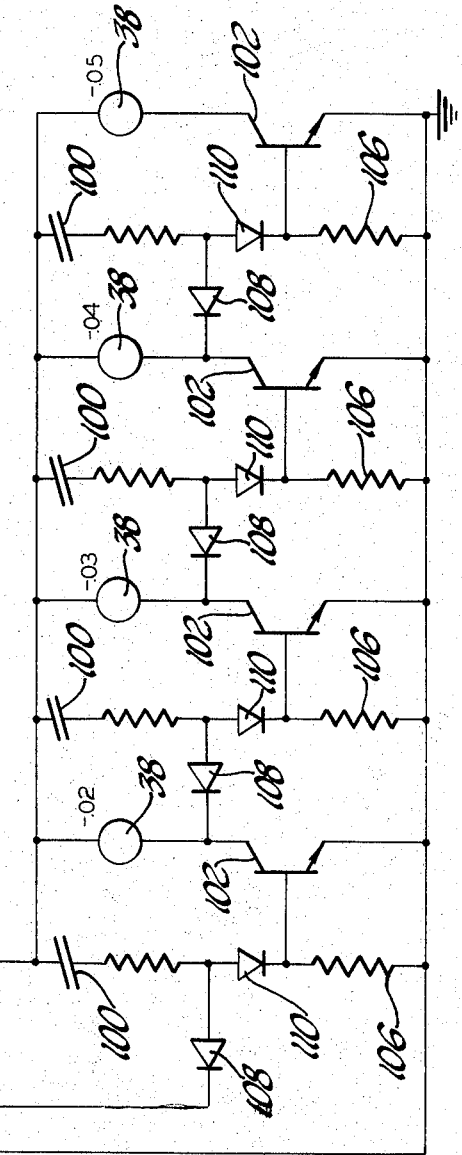
Fig. 5

SELF-ACTUATED DIGITAL LOCATION SENSOR

BACKGROUND OF THE INVENTION

1. Field of the Invention

This invention relates to a fluid powered probe for measuring the linear distance between a reference point and a test point employing a brush and commutator arrangement for generating signals proportional to the position of the probe within its housing.

2. Prior Art

In manufacturing operations there is often a need to measure the location of a workpiece surface relative to a reference location in order to inspect the effect of previous manufacturing operations or to insure the proper position of the workpiece within a fixture. A wide variety of gauging devices are available for making these measurements, ranging in complexity from a hand-held ruler to automatic probes controlled by servo-systems and providing digital outputs of their measured positions. The latter devices provide the advantages of being fully automatic, quick in operation, and having a high degree of accuracy but their very complex actuation, control, and measurement systems are quite expensive and difficult to maintain.

3. Summary of the Invention

The present invention contemplates a probe for automatically measuring distance between a test point and a reference point and providing a digital output which is very low in cost compared to prior art devices, is compact and self-contained so that it may be readily installed as a unit on a wide variety of inspection equipment and is highly reliable in operation. Broadly, the probe employs an elongated housing and a rod having one end slidable within the housing and the other end projecting through an opening in the housing. A piston connected to the rod is movable within a chamber in the housing under fluid pressure admitted to the chamber to cause the rod to extend from the housing against the bias of a spring which retracts the rod when the pressure is removed.

A commutator employing a plurality of elongated parallel segments extending transversely to the direction of motion of the rod is fixed to the housing and a brush carried by the rod assembly contacts the commutator. The spacings between the commutator segments are all equal and the bearing area of the brush on the commutator exceeds this gap so that the brush, moving with the rod, contacts the next successive commutator segment before separating electrically and mechanically from the previous segment. The brushes also make continuous contact with a common, longitudinally extending commutator segment and electrically connect this common segment to the laterally extending commutator segment or segments simultaneously contacted by the brush.

The commutator segments are connected to logical circuitry which senses which segment of segments are connected to the common. When more than one segment is connected to the common the circuitry gives one of the two contacted segments priority over the other and thus eliminates the difference in outputs which would otherwise occur when the brush contacted the segment when moving in opposite directions. This "make before break" technique associated with the priority logic provides the unit with an unusually high degree of accuracy despite the simplicity of the sensor arrangement.

The commutator segment contacted by the brush, or that one of the pair of segments contacted by the brush which has priority, acts to drive an output indicator signifying the position of the rod relative to the housing. In the simplest arrangement there might only be a pair of commutator segments and a pair of associated output indicators. The probe would thus act as a "go — no go" gauge indicating whether the measured surface is within a predetermined range of the reference surface. Three contacts and indicators might be provided to provide an indication of whether the test surface is within a predetermined range of the reference surface. Alternatively, any greater number of segments might be employed to provide more detailed information as to the position of the test surface. The widths of the commutator segments and thus the ranges represented by the indicators may be varied for particular applications.

The indicators preferably take the form of lights but the output might be provided to other associated systems such as a computer.

One of the central features of the present invention is the provision of integrated mechanism for contacting the test surface and sensing its location. This integration shares many components which would have to be duplicated were separate probes, actuators and sensors joined together. For example, the probe rod itself forms the support for the brushes and the actuator housing forms the support for the commutator segment. The unit thus formed is accordingly substantially more compact than would be in assemblies formed from components, is easier to install, and has a higher accuracy because of the elimination of coupling mechanisms with inherent slop and backlash.

The preferred embodiment of the present invention is mounted by means of a threaded cylindrical collar affixed to the end of the housing surrounding the rod. This may be supported in a hole in a fixture with a pair of nuts and may be adjusted to zero any particular probe position relative to the supporting surface. The system of zeroing employs a pair of indicator lights representing the two sensor points on either side of the zero position mounted on the housing. The rod is extended to the appropriate length and the position of the housing relative to its fixed supporting fixture is adjusted until the transition point between the two lights is realized.

Since the brushes merely act to bridge the commutator segments with the common segment, they require no external connections and all of the electrical connections are made to the fixed circuit board which contains the commutator segments. This eliminates the need for flexible wires attached to the brush which are commonly employed in other sensor arrangements.

Another aspect of novelty of the present probe is the nature of the electronic circuitry which senses the commutator segments that are contacted by brushes and gives one of a pair of adjacent segments priority over the other when both are simultaneously contacted in order to provide a unique switching point which for each associated light pair independent of the direction of motion of the commutator and without any histeresis.

The preferred embodiment of the logic circuitry takes the form of transistors, one coupled to each contact so that the transistor is normally conductive when its associated commutator segment is contacted by the brush. However, each transistor is coupled to its adjacent transistor so that when both of a pair of adjoining commutator segments are contacted by the brush the transistor connected to one segment clamps the transistor connected to the adjacent segment so as to prevent it from conducting. This insures that the transition between the outputs associated with a pair of adjoining commutator segments always occurs when the brush leaves or arrives at the same edge of one member of the pair.

While the preferred embodiment of the invention provides single output at a time, other embodiments could provide parallel outputs coded in any appropriate form, such as Grey code, binary code or binary coded decimal. Each arrangement would involve a plurality of parallel commutator segments with separate brushes for each segment. The teachings of the present invention are equally applicable to such parallel output arrangements.

Other objectives, advantages and applications of the present invention will be made apparent by reference to the following detailed description of a preferred embodiment of the invention.

The description makes reference to the accompanying drawings in which:

FIG. 1 is a perspective, partially schematic view of a workpiece support and a probe formed in accordance with the present invention supported relative to the workpiece support to gauge the deviation of a point on the surface of the workpiece from a zero position;

FIG. 2 is a cross sectional view of the probe of FIG. 1 which forms a preferred embodiment of the invention;

FIG. 3 is a partial detail cross sectional view of the probe of FIG. 1 taken along line 3—3 of FIG. 2;

FIG. 4 is a detailed view of the commutator of the present invention; and

FIG. 5 is a schematic view of the circuitry of the present invention.

Referring to the drawings, FIG. 1 illustrates a probe, generally indicated at 10, formed in accordance with the present invention as it might be applied in a typical production situation to inspect the location of a point on a formed metal sheet 12 which may have been formed in a previous pressing operation. In order to inspect the part it is supported on a fixture 14, illustrated in schematic form (in a unique position). The probe 10 is itself supported on a base 16 affixed relative to the fixture 14 and having a support plate 18 projecting outwardly therefrom. A threaded cylindrical neck 20 forming part of the probe passes through a hole in the plate 18 and the probe is affixed in the hole by a pair of nuts 22 and 24 disposed on opposite sides of the neck. The probe body 26 is formed integrally with the neck 20 and is therefore fixed with respect to the base 16 and the fixture 14. The probe rod 28 projects from the body and has a contact button 30 with a spherical end surface fixed to its outer end. A source of pneumatic power 32 is coupled to the probe through an air supply line 34 and causes the rod 28 to extend until it is stopped by contacting the point to be gauged on the surface of the workpiece 12.

A panel 36 contains a plurality of indicator lights 38 which are successively energized as the rod 28 moves toward the workpiece 12. Different dimensional indications 40 are associated with each of the lamps. One, and only one, of the lamps 38 is energized for each position of the rod 28 relative to the housing 26. In the preferred embodiment of the invention, the indicia 40 designate the departure of the contact button 30 from a zero point representing the ideal position of the contacted surface of the workpiece 12 while it is supported on the fixture 14. Thus, the lamps 38 are denominated with the dimensions, positive and negative, from this ideal location. The lamps could alternatively be denominated in distances from a reference point which might be the point of support of the probe 10 on the plate 18.

In use a workpiece 12 is positioned on the fixture 14 and air is supplied to the probe from the source 32 causing the rod to extend until the end button 30 contacts the workpiece. The lamp 38 illuminated at the time of contact indicates the range of the deviation of the contacted surface point from its ideal location. The center lamp is illuminated when the test point is within a predetermined range, plus or minus, from the zero position.

FIG. 2 illustrates the probe 10 in greater detail. The probe has a generally cylindrical body 40 having a central longitudinally extending bore 44. A section of the surface of the body is cut away as at 46 to expose a portion of the interior of the cylinder. A cylindrical cover 26 formed of sheet metal surrounds the body so as to close off the cut away section 46. A smaller diameter threaded neck 20 projects from the body. The neck 20 has a central partial bore 48 communicating with the bore 46, but closed off at its extreme end. The support nuts 22 and 24 are threaded on the neck 20 to retain it in a support such as plate 18 and keyway 50 is formed along one edge of the threaded neck to receive a mating key which might be formed in the supporting plate.

A cylindrical piston member 52 having an outer diameter suitable for making a sliding fit with the bore 44 is slidably supported in the bore. The rod 28 is a reduced diameter cylindrical extension of the piston which projects through a hole 54 formed in the extreme end of the neck 20. A keyway 56 is formed in a portion of the surface of piston 52 and a pin 58 supported in a radially extending hole through the wall of the housing 42 and retained by the cover 26 projects into the keyway 56 to align the piston 52 relative to the housing. A cup-shaped leather piston seal 60 is affixed to the rear end of the piston 52 by means of a bolt 62 passing through an aperture in the center of the seal and fastened in a central threaded hole 64 formed in the rear of the piston 52.

A cylindrical plug 66 is fitted in the rear end of the bore 44 and is retained therein by a set screw 68 passing through the cover 26 and the housing 42 and projecting into a hole in the plug 66. The plug 66 has a central passage 70 threaded at one end to receive the pneumatic hose 32. A resilient annular seal 72 is fitted in a groove in the plug 66 and acts to seal the plug against the interior wall of the housing.

A coil spring 74 is fitted about the rod 28 so that it is captured between the piston 52 and the end of the bore 48 in the neck 20. The spring acts to bias the piston 52 and the rod 28 toward a retracted position within the housing wherein the head of the bolt 62 retaining the piston seal 60 abuts the interior end of the plug 66. Air pressure introduced from the line 34 into the passage 70 in the end plug presses against the rear end of the piston to move it forward against the bias of the spring causing the rod 28 to extend. When the air pressure is decreased the spring 74 forces the piston toward a retracted position.

The piston 52 has a relief 76 cut in one side and a pair of brushes 78 (best illustrated in FIG. 3) are retained against the wall of the relief. The brushes consist of a pair of flat, spaced, parallel strips of a conductive spring-like metal having a cylindrical nylon rod 80 molded about them adjacent to one end so that the rod extends transversely to the extension of the brushes and the brushes pass through the center of the rod. The ends of the brushes adjacent to the rod 80 are retained by a pair of screws 84 to a support block 82 consisting of a rectangular sheet of copper-clad phenolic. The screws pass through holes in the brushes 78 and in the block 82 and mate in threaded holes 84 formed in the relief surface 76 of the piston 52. The radius of the rod 80 is slightly greater than the height of the support block 82 so the free ends of the brushes 78 are forced away from the relief surfaces 76. The copper-clad on the support block 82 electrically connects the two brushes.

The brushes have rounded free ends 86 which bear against the surface of a printed circuit board 88 supported on the housing 42 so as to bridge the cut-away section 46. The printed circuit face of the board is turned downwardly in the direction of the brushes 78 so that the ends of the brushes contact the board.

The circuit board 88 is preferably formed by conventional etching techniques and includes a commutator pattern illustrated in detail in FIG. 4. The board may or may not support additional electrical components which are interconnected by the printed circuit pattern. While the preferred embodiment of the invention does include such components, they may alternatively be contained within the indicator housing 36 and the illustrations of the invention have not shown those components to reduce the complexity of the drawings. They are schematically indicated in FIG. 5 and their manner of incorporating on the circuit board 88 is well within the skill of the art.

As illustrated in FIG. 4, the commutator has one elongated conductive section 90 extending parallel to the longitudinal axis of the probe 10 and hereinafter termed the "common" section. A conductive segment 92 connects the common strip to additional circuitry.

The printed pattern includes a second commutator section including eight thin parallel strips 94 extending transversely to the longitudinal axis of the probe 10, and a pair of end sections 96 sandwiching the segments 94. These transverse commutator segments 94 measure the extension of the piston 52 by means of their contact with the brushes 78 which move with the piston.

The radius of the bent ends 86 of the brushes and the spacing of the commutator segments 94 are such that as the brushes move with the piston they make contact with the next strip 94, or the sandwiching end sections 96, before breaking contact with the previous contacted strip. Thus they are always in contact with at least one and sometimes two of the commutator sections or the end sections. In the preferred embodiment of the invention the spaces between the strips 94 and the end sections 96 are each 0.004 inches and the brushes have an end radius of 0.017 inches. The width of each strip plus the width of the adjacent gap is made equal to the intervals to be measured.

FIG. 5 schematically illustrates the commutator, the indicator lamps, the associated electronic logic circuitry, and their manner of interconnection. The contacts which are created between the common strip 80 and the commutator strips 94 and end segments 96 as the brushes meet these elements are schematically illustrated as contacts 100.

Thus, a particular set of contacts close when the brushes 78 contact the associated commutator segment. One of the brushes 78 is always in contact with a common segment 90 and half of each contact set 100 is schematically accordingly illustrated as being connected to the positive terminal of the power supply as is the common segment. The other half of each contact set is connected to the base of an associated transistor 102 through a current limiting resistor 104. Biasing resistors 106 connect the base of each transistor to the negative terminal power supply and the emitter of each transistor 102 is also grounded. The indicator lamp 38 associated with each commutator segment is connected to the collector of its associated transistor 102 and to the positive terminal of the power supply so that the lamp is energized when the transistor is conductive.

In general, when a contact set 100 is closed the voltage applied to the base of its associated transistor 102 causes that transistor to conduct and energize the lamp 38 connected in the collector circuit. In order to prevent two indicator lamps 38 from being simultaneously energized when the brush 78 contacts a pair of adjacent commutator segments 94 or 96 the collector of each transistor 102 except the last one in the chain is connected to the current limiting resistance of the transistor 102 associated with an adjacent contact pair through a diode 108. Other diodes 110 are disposed between each current limiting resistor 104 and the base of each transistor with the exception of the first one in the chain thus created. To illustrate the operation of this arrangement suppose that the two contact sets 100 illusrated in the upper left-hand corner of the schematic drawing of FIG. 5 were simultaneously closed. The closure of the left-most contact pair would cause its associated transistor to conduct and effectively short the resistor 104 associated with the next contact set to ground and thus prevent the second transistor 102 in the chain from conducting and from energizing its associated lamp 38. Thus, whenever these two contact sets are simultaneously energized, only the lamp associated with the left-most contact set will be illuminated. When the brushes 78 are making a transition from the first contact set to the second contact set, the left-most indicator light will remain on until the brush leaves the left-most contact set and then, and only then, will the light associated with the next contact set to the right be energized. When the brush is making a transition from the right-most contact to the left-most contact set, as soon as the brush makes contact with the left-most contact set the lamp associated with the right-most contact set will be extinguished and the lamp associated with the left-most contact set will be energized. This insures a transition between a pair of contiguous lamps occurring at the same physical point in the motion of the rod 28 independent of the direction of that motion.

In order to allow a "zeroing" of the probe 10 through adjustment of its position on the support plate 18, a pair of lamps 120 and 122, preferably taking the form of light emitting diodes, are supported on the housing 42 projecting through an appropriate hole in the cover 26. The lamp 120 is indicative of the plus 0.01 inch range in the preferred embodiment of the invention and the lamp 122 is representative of the minus 0.01 inch range. The transition point between the two represents the extension of the rod relative to the housing at the zero point. The light emitting diodes 120 and 122 are connected in the same manner as the lamps 38 to the collectors of the transistors 102 associated with the commutator segments straddling the zero point so the transition between these two lamps occurs exactly at the zero point. The associated lamp 38 on the indicator panel 36 is connected through a pair of diodes 124 to the emitters of both of the straddling transistors and is energized for a double distance range compared to the other lamps. A pair of diodes 126 are disposed between the light emitting diodes 120 and 122 and the collectors of their associated transistors.

To adjust the probe 10 to give a proper reading, one of the nuts 22 or 24 is loosened and the probe is moved within the plate 18 until the transition point between the illumination of the diodes 120 and 122 occurs. The nuts are then tightened to fix the probe.

Certain unique aspects of this read-out system make it adaptable to a self-checking system. For example, circuitry could be included to insure that a lamp is always on, only single lamp is on, and that the lamps are energized in their proper sequence. This sequence check could be made through use of a stepping switch. Warning signals could be provided in the event that any of the tests disclose improper operation.

The probe could also be designed to provide parallel coded outputs by employing pluralities of commutator tracks of a proper width to indicate the desired coding.

Having thus described our invention we claim:

1. A probe including: an elongated housing, a rod having one end slidably supported within the housing and the other end projecting from the housing; means for producing a force on said rod so as to cause it to move within said housing; a commutator including a plurality of segments which extend transversely to the direction of motion of the rod; a brush movable on said commutator, one of said commutator and said brush being supported for motion with said rod and the other being fixed relative to said housing; indicator means; and electrical circuitry connected to said transversely extending commutator segments, to said brush, and to said indicator means and operative to cause said indicator means to provide an output which is a function of the position of the rod relative to the housing, said circuitry means including elements connected between each adjacent pair of commutator segments operative to cause said indicator means to assume a first state when the brush contacts a first segment of said adjacent pair but not the second segment thereof, and a second state when the brush contacts a second segment of the pair, either alone, or in combination with the first segment of the pair, independently of the direction of motion of the brush in reaching such position.

2. The probe of claim 1 wherein said transversely extending commutator segments are so spaced relative to one another and the dimensions of the brush are such that the brush contacts a second, adjacent commutator segment before separating from a first commutator segment.

3. The probe of claim 2 wherein said indicator means includes a plurality of output devices, one associated with each transversely extending commutator segment.

4. The probe of claim 3 including a two state device connected in said circuitry with each commutator segment and its associated output device in such a manner that the device normally changes state, causing its associated output device to be energized, when its associated commutator segment is contacted by said brush, and is prevented from changing state, when its associated commutator segment is contacted by the brush, when the two state device associated with the adjacent commutator segment in a direction common to all sets of adjacent commutator segments, is at that time contacted by the brush.

5. A probe, including: an elongated housing; a rod having one end slidably supported within the housing and the other end projecting from the housing; means for producing a force on the rod to cause it to move within said housing; a commutator including a plurality of segments extending transversely to the direction of motion of the rod and a common segment extending parallel to the direction of motion of the rod; a brush supported for motion with respect to the commutator and including an element operative to bridge said common segment with one or more of said transversely extending segments, depending upon the position of the rod within said housing, one of said commutator and said brush being supported for motion with said rod and the other being fixed relative to said housing, the spacing between the transversely extending commutator segments and the dimensions of the brush being such that the brush moving relative to the commutator contacts a second, adjacent commutator segment before separating from a first commutator segment; indicator means and electronic circuitry connected to said commutator and said indicator means operative to cause said indicator means to assume a unique stage for each position of the brush relative to the commutator, independent of the direction of motion of the brush relative to the commutator in reaching such position.

6. The probe of claim 5 wherein said circuitry includes elements connected between each pair of adjacent transversely extending commutator segments which cause said indicator means to assume either a first state when the brush is in contact with a first member of a segment pair and not the second member, or a second state when the brush is in contact with the second member of the pair, either alone or in combination with the first segment of the pair.

* * * * *